US009066472B2

(12) United States Patent
Vandamme

(10) Patent No.: US 9,066,472 B2
(45) Date of Patent: Jun. 30, 2015

(54) AGRICULTURAL BALER WITH BALE CHUTE

(75) Inventor: Dirk A. R. Vandamme, Uitkerke (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/127,841

(22) PCT Filed: Jun. 28, 2012

(86) PCT No.: PCT/EP2012/062595
§ 371 (c)(1),
(2), (4) Date: Mar. 21, 2014

(87) PCT Pub. No.: WO2013/001018
PCT Pub. Date: Jan. 3, 2013

(65) Prior Publication Data
US 2014/0202342 A1   Jul. 24, 2014

(30) Foreign Application Priority Data

Jun. 29, 2011 (BE) .................................. 2011/0403

(51) Int. Cl.
*A01F 15/08* (2006.01)
*A01F 15/14* (2006.01)

(52) U.S. Cl.
CPC ............. *A01F 15/0875* (2013.01); *A01F 15/14* (2013.01)

(58) Field of Classification Search
CPC .................................................. A01F 15/0875

USPC ....... 100/7, 179, 188 R, 240, 269.01; 56/341, 56/344, 432, 449
See application file for complete search history.

(56) References Cited

U.S. PATENT DOCUMENTS

| 5,384,436 | A | * | 1/1995 | Pritchard ....................... 177/136 |
| 5,941,169 | A | * | 8/1999 | Brown et al. ........... 100/188 BT |
| 6,033,172 | A | * | 3/2000 | Simon .......................... 414/24.5 |
| 6,134,870 | A | * | 10/2000 | Lippens et al. ................. 56/432 |
| 6,478,523 | B1 | * | 11/2002 | Meijer .......................... 414/111 |
| 6,901,719 | B2 | | 6/2005 | Viaud |
| 7,047,876 | B2 | | 5/2006 | Hoover et al. |

FOREIGN PATENT DOCUMENTS

| DE | 2851117 A1 | 6/1980 |
| DE | 29517425 U1 * | 1/1996 ............. A01F 15/08 |
| EP | 0974259 A1 | 1/2000 |
| EP | 1459618 A1 | 9/2004 |

* cited by examiner

*Primary Examiner* — Jimmy T Nguyen
(74) *Attorney, Agent, or Firm* — Patrick M. Sheldrake; Seyed V. Sharifi T.

(57) ABSTRACT

An agricultural baler having an hydraulic actuator and accumulator being interconnected such that the upward force of the hydraulic actuator on a bale chute in a first position of the bale chute is smaller than the downward force generated by the combined weight of the bale chute and a completed bale on the bale chute but in a second position of the bale chute is larger than the downward force generated by the weight of the bale chute to cause a completed bale to slide under the action of gravity along the bale chute and to fall onto the field from a trailing end of the bale chute.

12 Claims, 2 Drawing Sheets

AGRICULTURAL BALER WITH BALE CHUTE

This application is the US National Stage filing of International Application Serial No. PCT/EP2012/062595 filed on Jun. 28, 2012 which claims priority to Belgian Application BE2011/0403 filed Jun. 29, 2011, each of which is incorporated herein by reference in its entirety.

TECHNICAL FIELD

The current invention relates to an agricultural baler with a pivotable bale chute that is associated with a hydraulic actuator.

BACKGROUND ART

Such agricultural balers are already known to the person skilled in the art. DE2851117A1 for example describes an agricultural baler comprising a baling chamber and pick-up means collecting crop material from a field and feeding it rearwardly to conveyor means for receiving the crop material collected by the pick-up means and feeding it into the baling chamber. In the baling chamber baling means compress the crop material to a bale. The bale is received by a bale chute disposed at the outlet of the baling chamber. The bale chute lowers the completed bale onto the field after five bales have been arranged on the bale chute extending along a direction crossing the traveling direction of the baler. Thereto, several sensors means are arranged to the bale chute. The sensor means thereto comprise several hinging bars: two guiding bars extending along the traveling direction of the baler hinging over an axis of rotation mounted perpendicular to the traveling direction of the baler and a feeling bar extending downwardly and hinging over an axis of rotation mounted perpendicular to the traveling direction of the baler. The bale chute has a leading end connected to the outlet of the baling chamber for pivoting movement about an axis transverse to the direction of travel of the baler between a raised first position in which bales from the baling chamber can be received onto the bale chute and a lower second position which is sufficiently inclined to the horizontal to cause a completed bale to slide under the action of gravity along the bale chute and to fall onto the ground from a trailing end of the bale chute. The bale chute is provided to be pivoted between the first and the second position by an actuator in the form of a hydraulic piston. Upon sensing the presence of five completed bales ready to be lowered by the sensor means in the first position of the bale chute, the actuator pivots the bale chute to the second position and the bales are lowered onto the field. To power the hydraulic actuator, an hydraulic accumulator is hydraulically connected to the hydraulic actuator such that the hydraulic actuator exerts an upward force on the bale chute. The upward force extends along but opposes the direction of the gravitational pull.

However, the use of such sensor means is very cumbersome as large components, such as for example the hinging bars, are needed.

DISCLOSURE OF INVENTION

Therefore, it is an object of the current invention to provide an agricultural baler in which the use of the relative large components for detecting the presence of a completed bale ready to be lowered onto the field is avoided.

This is achieved according to the characterizing part of the first claim.

Thereto, the hydraulic actuator and the hydraulic accumulator are provided such that the upward force of the hydraulic actuator on the bale chute in the first position of the bale chute is smaller than the downward force generated by the combined weight of the bale chute and a completed bale on the bale chute but in the second position of the bale chute is larger than the downward force generated by the weight of the bale chute.

When the hydraulic actuator, preferably an hydraulic cylinder, exerts such an upward force, caused by the presence of the pressure of the hydraulic fluid within the assembly of the hydraulic actuator and the hydraulic accumulator, on the bale chute, the bale chute remains in the first position as long as no completed bale is present on the bale chute. However, when a completed bale is present on the bale chute, the downward force generated by the combined weight of the bale chute and the bale will cause a downward force opposing the upward force and being larger than the upward force such that the bale chute will start pivoting around the axis transverse to the direction of travel of the baler from the first position towards and up to the second position. In the second position the completed bale will slide under the action of gravity along the bale chute and to fall onto the field from a trailing end of the bale chute. Therefore, only the downward force generated by the weight of the bale chute without the weight of the completed bale opposes the upward force caused by the hydraulic actuator in the second position of the bale chute such that the hydraulic actuator pivots the bale chute from the second position to the first position. Since the movement of the bale chute is directed by the assembly of the hydraulic accumulator and the hydraulic actuator the need for additional sensor means is being dispensed with and therefore the use of cumbersome sensor means is avoided.

According to preferred embodiments of the current invention, the bale chute in the first position slopes with respect to the horizontal such that the leading end is higher than the trailing end. Such a first position allows to reduce the travelling distance between the first and the second position.

According to more preferred embodiments of the current invention, the sloping of the bale chute is such that upon completion of a completed bale, the completed bale glides from the leading end towards the trailing end of the bale chute. In such a configuration, the completed bale after completion is almost immediately transported towards the trailing edge of the bale chute without requiring additional manipulations such that bale can be deposited onto the ground more continuously and more rapidly.

According to preferred embodiments of the agricultural baler according to the present invention, the hydraulic actuator is an hydraulic cylinder, with a cylinder barrel attached to the baling chamber and a piston rod extending from a piston in the cylinder barrel towards the outside of the cylinder barrel, the hydraulic cylinder being connected to the bale chute.

When for example using such an hydraulic cylinder as hydraulic actuator, movement of the piston rod due to the pivoting of the bale chute causes the piston to move within the cylinder barrel such that hydraulic liquid is transported from and towards the hydraulic accumulator such that the pressure within the accumulator may change, for example when using a spring or compressed gas in the accumulator to pressurize the hydraulic liquid, during pivoting of the bale chute. As the pressure in the accumulator changes when a completed bale is present on the bale chute, the upward force changes when the bale chute is pivoting from the first position to the second position such that it counteracts its origin, i.e. the added weight of the completed bale, up to the moment that the upward force equals the downward force generated by the combined weight of the bale chute and the completed bale on the bale chute in the second position of the bale chute. In such case the pivoting of the bale chute stops at the second position of the bale chute. Although in such an embodiment the use of an hydraulic cylinder is preferred, it is not critical.

Such an embodiment is also not critical for the current invention and the pivoting movement of the bale chute with the completed bale can also be stopped by stopping means impairing the further downward pivoting of the bale chute.

When using an hydraulic cylinder as hydraulic actuator as described above, the piston rod preferably is pushed into the cylinder barrel when the bale chute is pivoted from the first position to the second position and the piston rod is pulled out off the cylinder barrel when the bale chute pivots from the second position to the first position.

According to preferred embodiments of the present invention a valve is positioned in the hydraulic connection between the hydraulic accumulator and the hydraulic actuator to control the passage of hydraulic fluid. Such a valve allows to interrupt the hydraulic connection between the hydraulic accumulator and the hydraulic actuator such that the pivoting of the bale chute can be prevented or even stopped as no hydraulic fluid can move between the hydraulic actuator to the hydraulic accumulator.

According to further preferred embodiments a check valve is positioned parallel to the valve in the hydraulic connection between the hydraulic accumulator and the hydraulic actuator. Such a check valve allows that, when the valve interrupts the hydraulic connection between the hydraulic accumulator and the hydraulic actuator, a specific movement of the bale chute is still allowed depending on the configuration of the hydraulic actuator and the check valve. For example, when the hydraulic accumulator and the hydraulic actuator are configured such that when the bale chute pivots from the first position to the second position hydraulic fluid is moved from the hydraulic actuator to the hydraulic accumulator, the check valve could be positioned such that, upon closing of the corresponding valve, only pivoting of the bale chute from the second position to the first position is allowed by positioning the check valve such that after closing the valve hydraulic fluid can still move from the hydraulic accumulator to the hydraulic actuator. According to another embodiment, the check valve is positioned such that, upon closing of the corresponding valve, only pivoting of the bale chute from the first position to the second position is allowed by positioning the check valve such that after closing the valve hydraulic fluid can still move from the hydraulic actuator to the hydraulic accumulator.

According to preferred embodiments of the current invention, when the bale chute is in the first position, a trailing end of the bale chute suspends from a linkage means extending from a top part of the outlet of the baling chamber of the agricultural baler and the hydraulic actuator is connected to the linkage means such that the hydraulic actuator is provided to lower or pull up the linkage for moving the bale chute between the first position and the second position. It has been found that such an agricultural baler can be produced starting from a known agricultural baler having a pivoting bale chute suspended with a trailing end from a linkage means extending from a top part of the outlet of the baling chamber by adding an hydraulic actuator such that existing agricultural balers can be easily adapted and improved to agricultural balers according to the current invention without requiring substantial changes to the existing agricultural baler.

Such an embodiment is however not critical for the invention and the hydraulic actuator can also be situated below the bale chute. In such a configuration the space above the bale chute is kept clear for, for example, receiving completed bales. In such an embodiment, when using an hydraulic cylinder as hydraulic actuator as described above, the piston rod preferably is pushed into the cylinder barrel when the bale chute is pivoted from the first position to the second position and the piston rod is pushed out off the cylinder barrel when the bale chute pivots from the second position to the first position.

According to preferred embodiments of the current invention, a first end part of the hydraulic cylinder is connected to the linkage means and a second end part is connected to the top part of the outlet of the baling chamber. It has been found that mounting a hydraulic cylinder in such a way can be easily done to an existing agricultural baler as described above.

According to preferred embodiments of the current invention, at least part of the linkage means extends along the hydraulic cylinder. Such a construction allows even to maintain the existing linkage means, such as for example a chain although other linkage means are also possible, without requiring to shorten the linkage means to allow reception of the hydraulic actuator.

According to preferred embodiments of the current invention, the linkage means comprise an interconnection bar extending along the hydraulic cylinder and being connected to the first end part of the hydraulic cylinder. The interconnection bar comprises a longitudinal opening for slidingly receiving the second end part of the hydraulic cylinder. With such an interconnection bar, existing agricultural balers can be easily transformed into agricultural balers according to the invention.

According to preferred embodiments of the current invention, the first end part is part of the cylinder barrel.

According to preferred embodiments of the present invention, the agricultural baler comprises tying means for encircling said completed bale with one or more strands of tying material. Such tying means allow to strengthen the bales completed with the agricultural baler.

BRIEF DESCRIPTION OF DRAWINGS

The invention will be further elucidated by means of the following description and the appended figures.

BEST MODE FOR CARRYING OUT THE INVENTION

Figure 1:
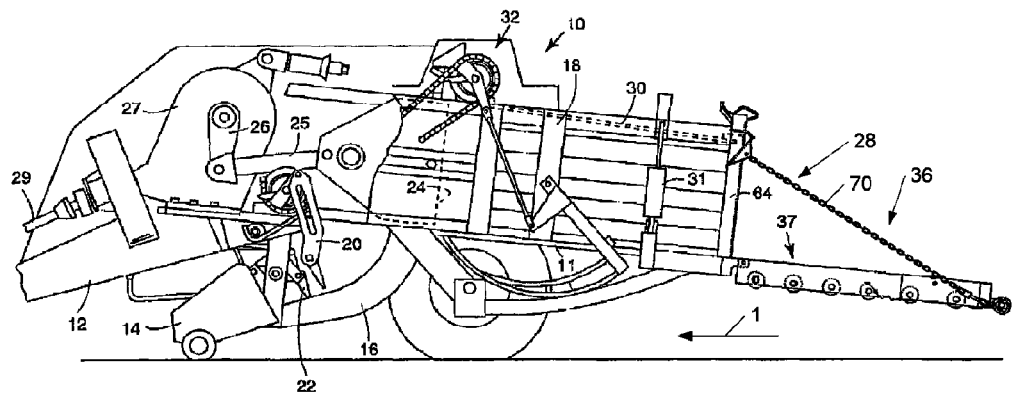
FIG. 1 shows an overview of an embodiment of the agricultural baler according to the current invention.

In the following detailed description, numerous specific details are set forth in order to provide a thorough understanding of the invention and how it may be practiced in particular embodiments. However, it will be understood that the present invention may be practiced without these specific details. In other instances, well-known methods, procedures and techniques have not been described in detail, so as not to obscure the present invention. While the present invention will be described with respect to particular embodiments and with reference to certain drawings, the invention is not limited hereto. The drawings included and described herein are schematic and are not limiting the scope of the invention. It is also noted that in the drawings, the size of some elements may be exaggerated and, therefore, not drawn to scale for illustrative purposes.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice of the invention.

Furthermore, the terms first, second, third and the like in the description and in the claims, are used for distinguishing between similar elements and not necessarily for describing a sequential or chronological order. The terms are interchangeable under appropriate circumstances and the embodiments of the invention can operate in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

The term "comprising", used in the claims, should not be interpreted as being restricted to the means listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B.

The terms "front", "rear", "forward", "rearward", "left" and "right" used throughout this description are determined with respect to the normal direction of travel of the machine in operation. However they are not to be construed as limiting terms.

FIG. 1 shows a preferred embodiment of an agricultural baler 10 according to the invention comprising a frame 11 which is equipped with a forwardly extending tongue 12 provided with hitch means (not shown) at its front end for coupling the baler 10 to a towing tractor. The direction 1 indicates the forward driving direction of the tractor and baler combination. A conventional pick-up assembly 14 lifts windrowed crop material off the field as the baler 10 is travelled thereover and delivers such material into the front end of a rearwardly and upwardly curved, charge-forming feeder duct 16. The duct 16 communicates at its upper end with an overhead, fore-and-aft extending baling chamber 18 into which crop charges are loaded by a cyclically operating stuffer mechanism 20. A continuously operating packer mechanism 22 at the lower front end of the feeder duct 16 continuously feeds and packs material into the duct 16 as to cause charges of the crop material to take on and assume the internal configuration of the duct 16 prior to periodic engagement by the stuffer 20 and insertion up into the baling chamber 18. The feeder duct 16 may be equipped with means for establishing whether a complete charge has been formed therein and operating the stuffer 20 in response thereto. Each action of the stuffer 20 introduces a "charge" or "flake" of crop material from the duct 16 into the chamber 18.

A plunger 24 reciprocates in a fore-and-aft direction within the baling chamber 18 under action of a pair of pitman rods 25 which are linked to the crank arms 26 of a gearbox 27 rotated by a shaft 29 which is connected to the PTO shaft of the tractor. The reciprocating plunger 24 pushes each new charge introduced into the baling chamber 18 rearwardly and forms the subsequent charges into a bale 34 of crop material, which is pushed by the plunger 24 toward a rearmost discharge aperture 28 of the chamber 18.

The baling chamber 18 comprises at least one movable wall portion 30 of which the position can be adjusted to vary the cross section of the aperture 28. Reduction of this cross section will increase the resistance to rearward movement of the crop bales and hence the density of the crop material contained therein. Similarly an increase in cross section will reduce the resistance and the density of the newly formed bales. The position of the wall portion 30 is controlled by a pair of actuators in the form of hydraulic cylinders 31 (only one shown in FIG. 1) which are installed between the frame 11 and the wall portion 30.

Each bale 34 preferably is securely bound in its final compacted form by a tying mechanism 32 before leaving the confines of the baling chamber 18. The length of each bale produced by the baler 10 can be adjustably predetermined by conventional means not shown. The tying mechanism comprises a series of periodically actuated needles which are normally stationed in a stand-by condition below the chamber 18 but which, when actuated, swing upwardly through and across the baling chamber 18 to present twine to a corresponding series of knotters positioned on top of the chamber 18 and extending across the width of the latter.

Figure 2:
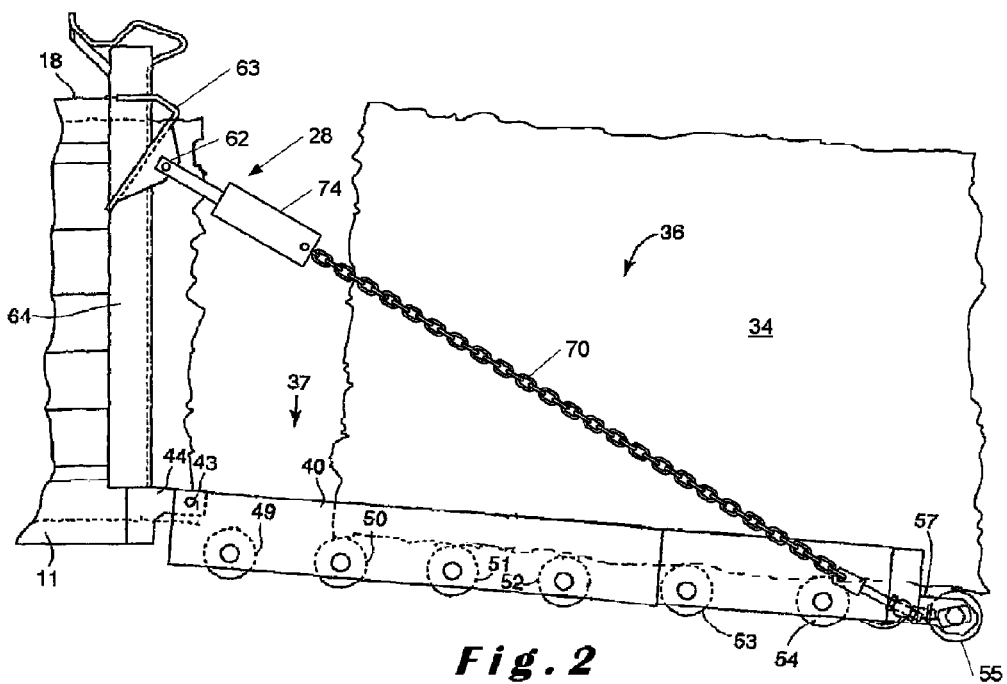
FIG. 2 shows a detail of the bale chute according to a different embodiment in the second position.

The baler 10 is equipped with bale discharge means 36 in the form of a bale chute, mounted to the rear of the frame 11, adjacent the discharge aperture 28 of the baling chamber 18. The completed bale 34 is received thereon and sustained thereby at least until the rear end of the bale 34 has completely left the confines of the baling chamber 18. FIG. 2 shows the discharge means 36 in further detail. They preferably, but not necessarily, embrace a chute portion 37. The chute portion 37 preferably comprises a rectangular frame 40, which is attached by a pair of pivot pins 43 to lugs 44 welded onto the rear end 64 of the baler frame 11.

The bale chute 36 shown in FIG. 1 in the first position slopes with respect to the horizontal such that the leading end is higher than the trailing end. Moreover, the sloping of the bale chute 36 is such that upon completion of a completed bale, the completed bale glides from the leading end towards the trailing end of the bale chute. In this case the completed bale would glide, more specifically roll, over rollers 49-54. Such a configuration is however not critical for the invention and the bale chute 36 can also be, for example, substantially horizontal.

The chute portion 37 contains a set of six transversely arranged rollers 49-54 which are journaled in the side members of the frame 40 and one additional roller 55, journaled between two rear extensions 57 of the frame 40. The latter roller 55 constitutes the most rearward part of the baler 10 during baling operations.

When the bale discharge means 36 are in their first position, i.e. when bales are being compressed in the baling chamber 18, the rear end of the bale chute 36, preferably the chute portion 37, is sustained by a linkage means 70 preferably on each side of the chute frame 40. Preferably, the linkage means 70 comprises chains.

When the bale chute 36 is in the first position, a trailing end of the bale chute 36 preferably suspends from a linkage means 70 as shown in the figures. The linkage means 70 extends from a top part of the outlet 28 of the baling chamber 18 of the agricultural baler 10. A support bracket 63 is located at the end of the outlet 28 of the baling chamber 18 and forms an intermediate part between the top part of the outlet 28 of the baling chamber 18 and a hydraulic actuator 74. The hydraulic actuator 74 is connected at one side to the linkage means 70 and on the other side to a connection point 62 of the bracket 63. That way, the hydraulic actuator 74 is provided to lower or pull up the linkage means 70 for moving the bale chute 36 between the first position and the second position, as shown in the figures.

Figure 3:
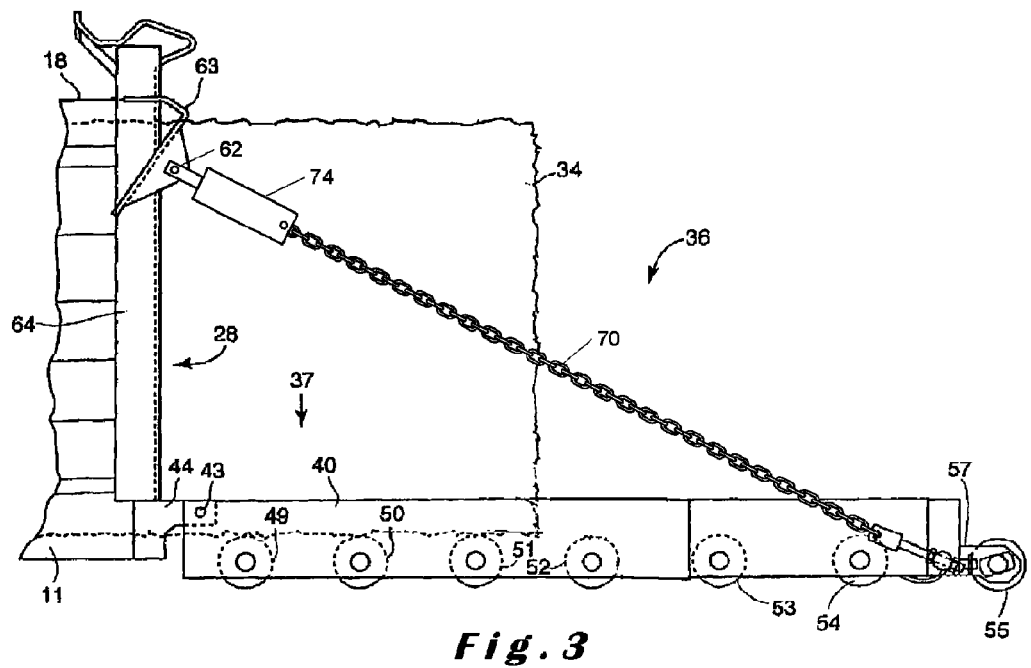
FIG. 3 shows a detail of the bale chute according to FIG. 2 in the first position.

FIGS. 2 and 3 show that the linkage means are connected to the hydraulic actuator 74, with one end part of the hydraulic actuator 74, preferably a hydraulic cylinder, being connected to the linkage means 70 and the other end being connected to the top part 62 of the outlet 28 of the baling chamber 18 of the agricultural baler 10 with the hydraulic actuator 74 and the linkage means 70 aligned along a mutual imaginary line. For the sake of clarity, FIG. 1 does not show the hydraulic actuator 74.

Figure 4:
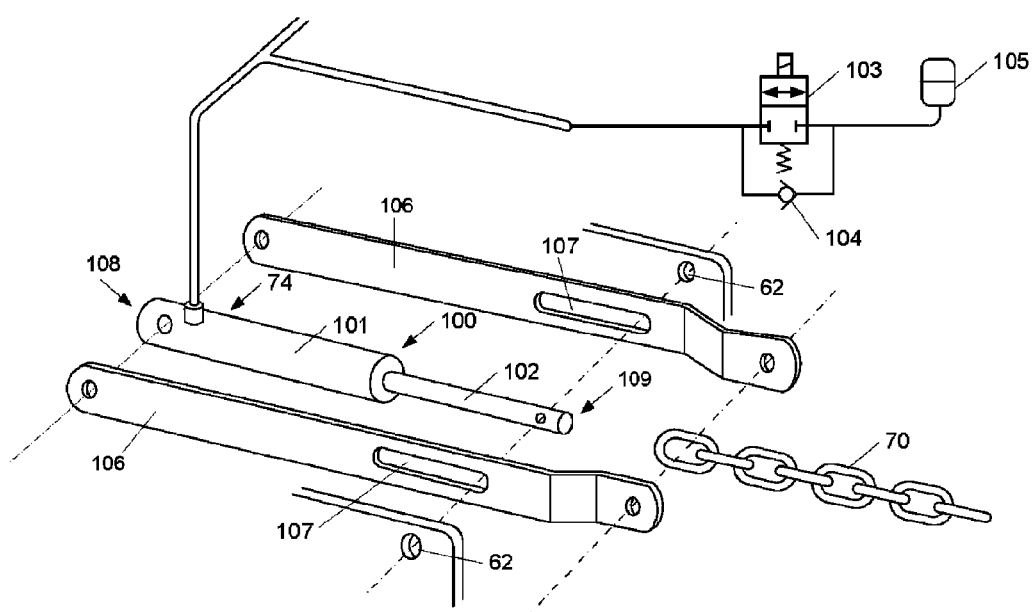
FIG. 4 shows a schematic overview of a detail of the hydraulic actuator according to a different embodiment.

However, according to a different embodiment shown in FIG. 4, a first end part 108 of the hydraulic cylinder 100 is connected to the linkage means 70 and a second end part 109 is connected to the top part of the outlet 28 of the baling chamber 18 with part of the linkage means 70 extending along the hydraulic cylinder 100. The linkage means 70 thereto comprise an interconnection bar 106 extending along the hydraulic cylinder 100 and being connected to the first end part 108 of the hydraulic cylinder 100, the interconnection bar 106 comprising a longitudinal opening 107 for slidingly receiving the second end part 109 of the hydraulic cylinder 100. In such an embodiment the hydraulic actuator 74 is less visible and therefore not shown in the overview of FIG. 1.

FIG. 4 shows that the first end part is part of the cylinder barrel 101. This is however not critical for the invention and the first end part could also be part of the piston rod 102.

FIG. 4 also shows a valve 103 and a check valve 104, as described above. The valve 103 and the check valve 104 shown in FIG. 4 are configured such that the valve 103 is in closed position to keep the bale chute 36 in line with the bale chamber 18 (position one as shown in FIG. 3). When a bale is placed completely on the bale chute 36, the bale chute 36 needs to be lowered such that the ejected bale can be dropped down. Therefore, the valve 103 needs to be activated, such that the extra pressure generated by the weight of the bale placed on the bale chute 36 will be able to pull on the linkage means 70, which at their turn will pull on the interconnection bar 106, such that the interconnection bar 106 will move the cylinder barrel 101 to slide over the piston rod 102. Hydraulic fluid will then be able to flow from the hydraulic actuator 74 to the accumulator 105, thus allowing he bale chute 36 to move from the first position, as shown in FIG. 3, to the second position, as shown in FIG. 2. Now, the bale chute 36 is in a position allowing the bale to move of the bale chute 36 for placement on the ground. The activation of the valve 103 can be triggered by the use of conventional means or sensors already available on the baler 10. E.g. conventional means such as a star-wheel (not shown) used to determine the length of each bale can be used to monitor and determine when a completed bale is on the bale chute such that the valve 103 can be activated to allow hydraulic fluid to flow from the hydraulic actuator 74 to the accumulator 105. Another possibility is to use the pressure generated by the weight of the bale placed on the bale chute 36 which pulls on the linkage means 70. This pressure can generate an electrical signal which can be used to activate the valve 103. A further possibility is to use the sensor which is connected to one of the rolls 49-54. When the bale moves over these rolls, the rolls will start to move. E.g. a counter can count the number of rotations made by the roll and determine the position of the bale on the bale chute 36. Once the bale is placed completely on the bale chute 36, again an electrical signal can be given to activate the valve 103. Yet another trigger mechanism is possible, such as a mechanical system having a pin which is e.g. located at the end of the bale chute 36. If a bale is pushed over the bale chute 36, it will push the pin downwardly. This downward movement may generate a subsequent movement which will then activate the valve 103. Once the bale is of the bale chute 36, hydraulic fluid is allowed to flow from the accumulator 105 back to the hydraulic actuator 74, pushing the barrel 101 outwards again and thus allowing the bale chute 36 to move from the second position to the first position.

Although not specifically shown in the figures, the linkage means 70 on both sides of the chute frame 40 are preferably, but not necessarily, provided with hydraulic actuators 74 configured to pivot the bale chute 36 between the second and the first position. Although each of the actuators 74 could be hydraulically connected to its own hydraulic accumulator 105, preferably both hydraulic actuators 74 are connected to the same hydraulic accumulator 105. In such a configuration, the hydraulic connections interconnecting both hydraulic actuators 74 with the hydraulic accumulator 105 comprise a mutual part, the mutual part comprising, if present, the valve 103 and, if present, the check valve 104 such that the valve 103 and check valve 104 control the motion of the both the hydraulic actuators 74.

Although not shown in the figures, the bale chute 36 can also be pivoted from the second position to the first position by means of an actuator, preferably in the form of an hydraulic cylinder 74, which can be mounted below the bale chute 36, preferably the front chute portion 37, between a support 75 welded to the rear end of the baler frame 11, and the bale chute 36, preferably through a lever arrangement (not shown in the figures).

Possible alternative embodiments of the bale discharge structure involve the use of a similar structure for a bale chute having less or no rollers 49-54, e.g. wherein the bales are guided along solid plates.

The invention claimed is:

1. An agricultural baler comprising:
 a baling chamber for use in compressing crop material to a bale;
 a bale chute disposed at an outlet of said baling chamber for receiving said bale and lowering the completed bale onto the field;
 wherein the bale chute has a leading end connected to the outlet of the baling chamber for pivoting movement about an axis transverse to the direction of travel of the baler between a first position in which bales from the baling chamber can be received onto the bale chute and a lowered second position which is inclined to the horizontal to cause a completed bale to slide under the action of gravity along the bale chute and to fall onto the field from a trailing end of the bale chute;
 a hydraulic actuator configured to pivot the bale chute between the second position and the first position;
 a hydraulic accumulator hydraulically connected to the hydraulic actuator such that the hydraulic actuator exerts an upward force on the bale chute, the upward force extending along but opposing the direction of the gravitational pull, the hydraulic actuator and the hydraulic accumulator are provided such that the upward force of the hydraulic actuator on the bale chute in the first position of the bale chute is smaller than the downward force generated by the combined weight of the bale chute and a completed bale on the bale chute but in the second position of the bale chute is larger than the downward force generated by the weight of the bale chute and wherein upward force equals the downward force generated by the combined weight of the bale chute and the completed bale in the second position of the bale chute.

2. An agricultural square baler according to claim 1, wherein the bale chute in the first position slopes with respect to the horizontal such that the leading end is higher than the trailing end.

3. An agricultural square baler according to claim 2, wherein the sloping of the bale chute is such that upon completion of a completed bale, the completed bale glides from the leading end towards the trailing end of the bale chute.

4. An agricultural baler according to claim 1, wherein the hydraulic actuator is a hydraulic cylinder, with a cylinder barrel attached to the baling chamber and a piston rod extending from a piston in the cylinder barrel towards the outside of the cylinder barrel, the hydraulic cylinder interconnecting the bale chute and the baling chamber for pivoting the bale chute by movement of the piston rod with respect to the cylinder barrel.

5. An agricultural baler comprising:
   a baling chamber for use in compressing crop material to a bale;
   a bale chute disposed at an outlet of said baling chamber for receiving said bale and lowering the completed bale onto the field;
   wherein the bale chute has a leading end connected to the outlet of the baling chamber for pivoting movement about an axis transverse to the direction of travel of the baler between a first position in which bales from the baling chamber can be received onto the bale chute and a lowered second position which is inclined to the horizontal to cause a completed bale to slide under the action of gravity along the bale chute and to fall onto the field from a trailing end of the bale chute;
   a hydraulic actuator configured to pivot the bale chute between the second position and the first position;
   a hydraulic accumulator hydraulically connected to the hydraulic actuator such that the hydraulic actuator exerts an upward force on the bale chute, the upward force extending along but opposing the direction of the gravitational pull, the hydraulic actuator and the hydraulic accumulator are provided such that the upward force of the hydraulic actuator on the bale chute in the first position of the bale chute is smaller than the downward force generated by the combined weight of the bale chute and a completed bale on the bale chute but in the second position of the bale chute is larger than the downward force generated by the weight of the bale chute, and wherein a first end part of the hydraulic cylinder is connected to the linkage and a second end part is connected to the top part of the outlet of the baling chamber.

6. An agricultural baler according to claim 5, wherein a valve is positioned in the hydraulic connection between the hydraulic accumulator and the hydraulic actuator to control the passage of hydraulic fluid.

7. An agricultural baler according to claim 6, wherein a check valve is positioned parallel to the valve in the hydraulic connection between the hydraulic accumulator and the hydraulic actuator.

8. An agricultural baler according to claim 5, wherein when the bale chute is in the first position, a trailing end of the bale chute suspends from a linkage extending from a top part of the outlet of the baling chamber of the agricultural baler and in that the hydraulic actuator is connected to the linkage such that the hydraulic actuator is provided to lower or pull up the linkage for moving the bale chute between the first position and the second position.

9. An agricultural baler according to claim 5, wherein at least part of the linkage extends along the hydraulic cylinder.

10. An agricultural baler according to claim 9, wherein the linkage comprise an interconnection bar extending along the hydraulic cylinder and being connected to the first end part of the hydraulic cylinder, the interconnection bar comprising a longitudinal opening for slidingly receiving the second end part of the hydraulic cylinder.

11. An agricultural baler according to claim 10, wherein the first end part is part of the cylinder barrel.

12. An agricultural baler according to claim 5, further comprising a tying mechanism configured-for encircling said completed bale with one or more strands of tying material.

\* \* \* \* \*